J. F. MIRRIELEES.
BELT DRIVE MECHANISM FOR DRILLING MACHINES AND THE LIKE.
APPLICATION FILED SEPT. 2, 1919.
1,388,876.
Patented Aug. 30, 1921.
2 SHEETS—SHEET 1.
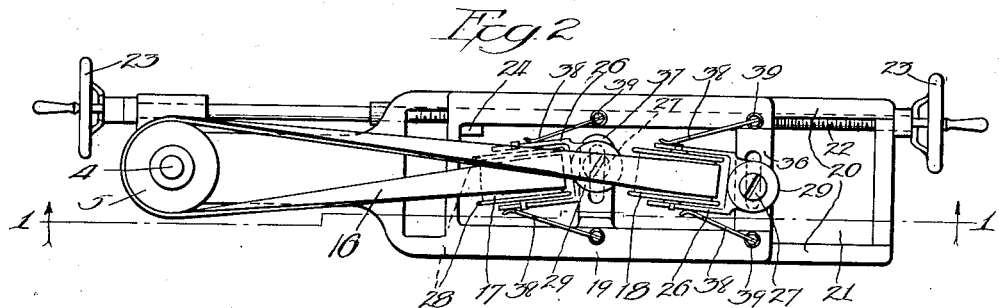
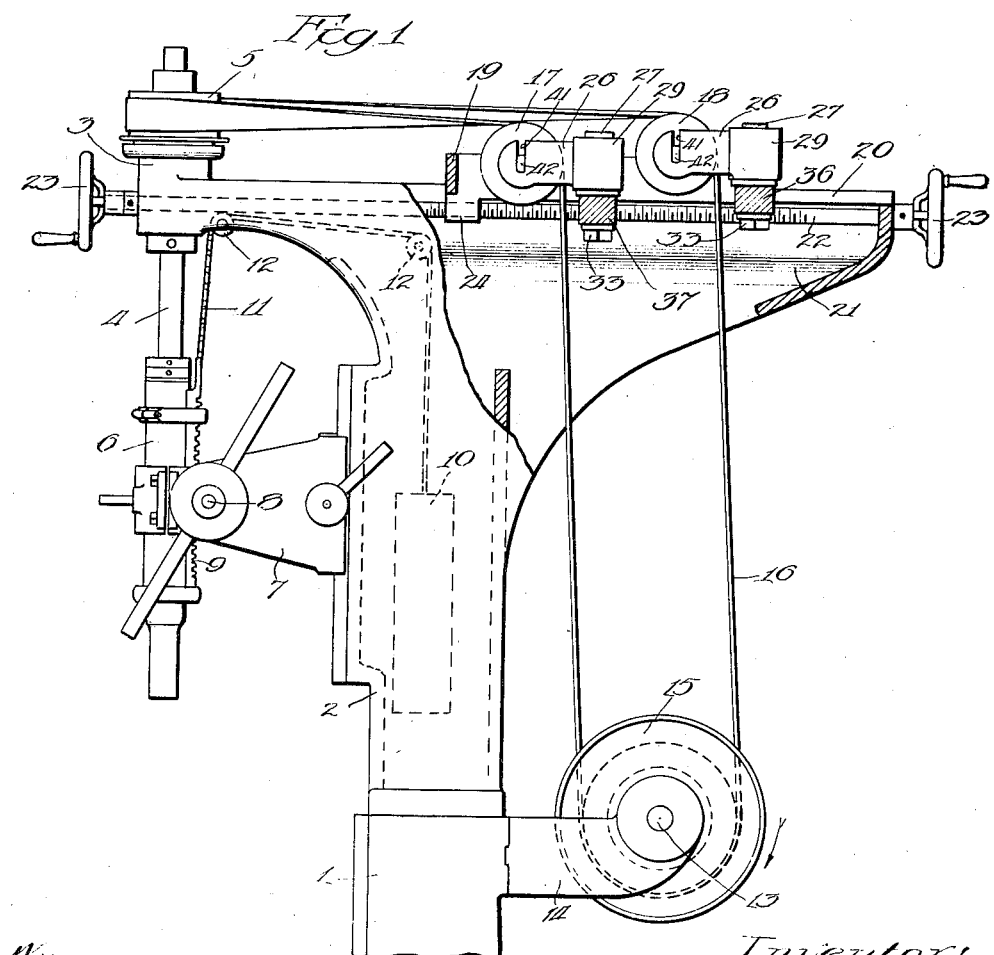

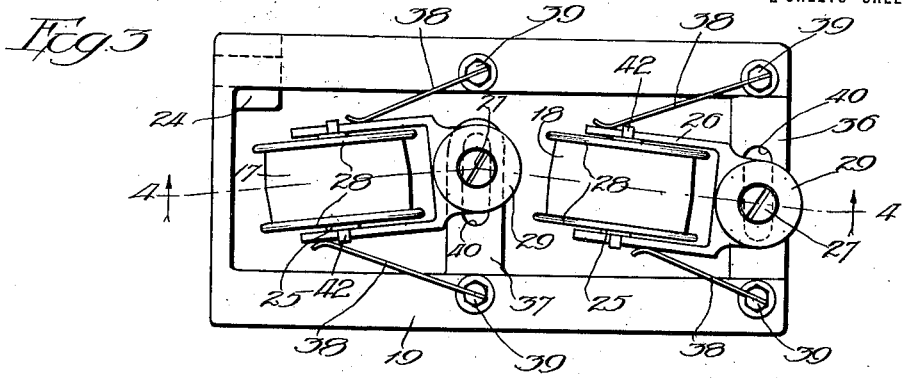
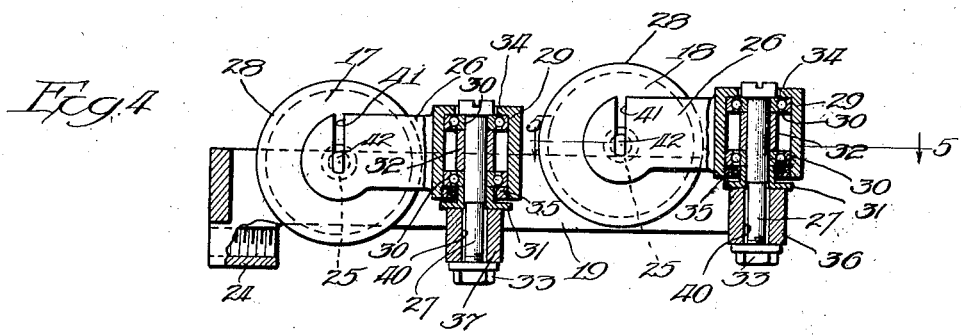
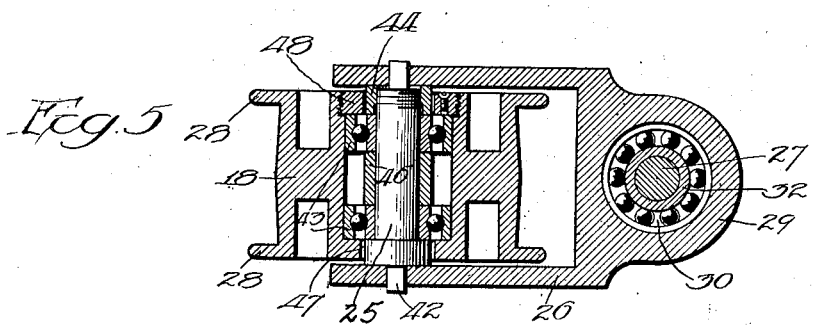

UNITED STATES PATENT OFFICE.

JAMES F. MIRRIELEES, OF CINCINNATI, OHIO, ASSIGNOR, BY MESNE ASSIGNMENTS, TO THE AVEY DRILLING MACHINE COMPANY, OF CINCINNATI, OHIO, A CORPORATION OF OHIO.

BELT-DRIVE MECHANISM FOR DRILLING-MACHINES AND THE LIKE.

1,388,876.     Specification of Letters Patent.    Patented Aug. 30, 1921.

Application filed September 2, 1919. Serial No. 321,095.

*To all whom it may concern:*

Be it known that I, JAMES F. MIRRIELEES, a citizen of the United States, and a resident of Cincinnati, county of Hamilton, and State of Ohio, have invented certain new and useful Improvements in Belt-Drive Mechanism for Drilling-Machines and the like, of which the following is a specification.

The invention relates to belt drive mechanism for drilling machines and the like, in which the driven shaft or spindle is connected to the driving shaft by a quarter-turn belt passing over idler pulleys. In such constructions, either the driving or the driven pulley, or both, are provided with a number of steps for the belt and the idler pulleys are adjustable to place the belt under proper tension when it is on different pulley steps, and in this way the drill spindle is driven at different speeds.

In drilling machines, and particularly when small drills are used, the spindles must be driven at high speed and there is apt to be a considerable lateral vibration to the belt. In present constructions, the belts do not always run squarely over the driving, driven and idler pulleys in the different adjusted positions of the pulleys, and the idle pulleys do not readily follow or accommodate themselves to the lateral movements of the belt. The present invention seeks to provide an improved idler pulley construction for such belt drives, in which the idler pulleys are sensitively mounted and adapted to follow all lateral vibrations of the belt. A further object of the invention is to provide means for adjustably mounting the idler pulleys to insure the proper tracking of the belt. The invention also seeks to provide an improved construction which will facilitate the quick application of endless belts.

The invention consists in the features of improvement hereinafter set forth, illustrated in the preferred form in the accompanying drawings and more particularly pointed out in the appended claims.

In the drawings, Figure 1 is a side elevation of a drilling machine with the present improved belt drive mechanism applied thereto, parts being shown in section on the line 1—1 of Fig. 2. Fig. 2 is a plan view.

Fig. 3 is a plan view on an enlarged scale of the idler carriage and parts mounted thereon. Fig. 4 is a longitudinal section on the line 4—4 of Fig. 3. Fig. 5 is a detail section on the line 5—5 of Fig. 4.

The machine frame as shown comprises a base portion 1 having a hollow standard or pedestal 2 mounted thereon. The latter is provided at its upper end with a forwardly projecting portion having a bearing 3 for the vertical driven shaft or spindle 4. The latter is vertically movable as usual through the bearing 3 and through a pulley 5 mounted thereon. The driven shaft or spindle is carried in a supporting sleeve 6 which is vertically movable through a guiding head 7 adjustably clamped on the front of the standard or pedestal 2. The guiding head is provided with a feed shaft 8 geared to a rack 9 on the sleeve 6. A counterweight 10 within the hollow standard is connected to the sleeve by a chain 11 extending over guide pulleys 12.

A horizontal driving shaft 13 extends from side to side of the machine and is journaled in a yoke or bracket 14 which is fixed to and projects rearwardly from the upper portion of the base 1. A speed cone or stepped pulley 15 is mounted on the driving shaft 13 and is connected by a flat, endless, quarter-turn belt 16 to the pulley 5 on the spindle shaft 4. The belt passes from one of the steps of the driving pulley 15 upwardly over a delivery idler 17, thence forwardly around the spindle pulley 5 and backwardly over a return idler 18 and thence downwardly to the driving pulley. To drive the spindle at different speeds, the driving pulley 15 is adjustable along the shaft 13 to bring any one of its steps in line with the belt 16. To place the belt under proper tension in the different adjusted positions of the driving pulley, one or both of the idlers are horizontally adjustable from front to rear of the machine. Preferably for this purpose, the idlers are supported upon a carriage 19 which is slidably mounted on horizontal guides 20 formed upon a rearwardly projecting portion 21 at the upper end of the standard 2. A horizontal screw shaft 22 is journaled in the upper portion or head of the standard 2, is provided at its ends with hand wheels 23 and engages a nut 24 formed upon the forward end of the carriage 19. By means of the screw, the carriage and the idlers mounted thereon can be adjusted horizontally and in forward and aft direction to place the drive belt 16 under proper tension.

The idler pulleys are journaled upon horizontal studs 25 and the latter in turn are carried by the arms of fork-shaped brackets 26 which are mounted on vertical studs 27 fixed to the carriage. As most clearly shown in Figs. 1 and 4, the idler brackets and the pulleys carried thereby are arranged one in front of the other, the rearmost or return idler being located somewhat higher than the forward delivery idler and the brackets and the idlers, as shown most clearly in Figs. 2 and 3, are normally in inclined position so as to properly deliver the belt to the driven pulley 5 and receive the same therefrom. To compel the idler pulleys to follow all lateral movements or vibrations of the belt, the pulleys are provided with flanges 28 for engaging the edges of the belt and the idler brackets 26 are pivotally mounted upon the studs 27 to swing horizontally and are preferably mounted upon anti-friction bearings carried by the studs.

In the form shown, the brackets are provided with enlarged hubs 29 and upper and lower ball bearings 30 fit within the bore of the hub and about the upper portion of the stud 27. The inner members of the ball bearings are engaged respectively by a head on the upper end of the stud and a flanged collar 31 which surrounds the stud and rests upon a portion of the idler carriage 19 and the bearings are held in proper spaced relation by a sleeve 32 surrounding the stud and interposed between the inner members of the ball bearings. A nut 33 on the lower end of the stud secures the latter and the ball bearings thereon in position. The hub 29 of the bracket is provided with an overhanging flange 34 at its upper end, which rests upon the outer member of the upper bearing and a collar 35 threaded into the lower end of the bore of the hub engages the outer portion of the lower ball bearing.

The stud for the rear return idler 18 is mounted upon the rear transverse end portion 36 of the idler carriage which is depressed below the longitudinal side portions thereof. The stud for the forward delivery idler 17 is mounted on a transverse member 37 which projects downwardly and inwardly from one side of the carriage and the end of which is preferably spaced, as shown in Figs. 2 and 3, from the other side of the carriage. The brackets extend forwardly from the pivot studs whereon they are swiveled by means of the anti-friction bearings described and, since the idlers are thus sensitively mounted and provided with flanges for engaging the edges of the belt, they will follow all lateral vibrations developed and thereby materially reduce the wear of the belt.

Spring devices are provided for preventing excessive vibrations of the sensitively mounted, laterally swinging idler brackets. Preferably as shown, a pair of leaf springs 38 are arranged to engage the opposite sides of each bracket. The outer rear ends of the springs are fixed to bolts 39 mounted on the sides of the carriage and the inner free ends thereof rest against the side arms of the brackets, as most clearly shown in Figs. 2 and 4.

To insure the proper tracking of the belt upon the driving and driven pulleys and also upon the idler pulleys, the latter are laterally adjustable and, for this purpose, the vertical pivot studs 27 extend through lateral slots 40 formed in the rear end portion 36 and the transverse member 37 of the idler carriage. By this means, the pulleys can be set to effect the proper tracking of the belt and changed if necessary from time to time in case the tracking of the belt should change after it has been used. As is well known, the tracking of different belts frequently varies and often the tracking of a belt will change after it has been used for some time. In the present improved construction, the idler pulleys can be adjusted to take care of these varying conditions.

To facilitate the application of endless belts such as are usually employed in operating high speed drills, the arms of the brackets 26 are provided with slots 41 open at their upper ends and the horizontal studs 25 on which the idler pulleys are journaled are provided with flattened projecting end portions 42 which are arranged to removably engage the slots or seats 41 in the arms of the supporting brackets 26. With this arrangement, the idler pulleys and the studs whereon they are journaled can be readily lifted from position and an endless belt can be dropped through the carriage, one stretch of the belt being passed through the opening at the end of the transverse member 37 and the idlers can then be replaced with the projecting end portions 42 of the idler studs in engagement with the slots or seats 41 of the brackets. In the form shown, ball bearings 43 are arranged in the hub of each idler pulley and about the stud 25. A head on one end of the stud and a nut 44 threaded on its opposite end engage the inner members of the ball bearings and hold the same in engagement with the ends of a spacing sleeve 46. An overhanging flange 47 on one end of the bore of the hub of the pulley and a collar 48 threaded into the other end of its bore engage the outer members of the ball bearings and hold the pulley in proper position thereon.

Obviously, changes may be made in the details set forth without departure from the essentials of the invention.

I claim as my invention:

1. A belt driving mechanism for drilling machines, comprising a longitudinal driving shaft, a vertical spindle shaft, pulleys on said shafts, a flat quarter-turn belt connecting said pulleys, a horizontally adjustable carriage, vertical studs fixed thereto, delivery and return idlers having flanges for engaging the edges of the belt and supporting brackets for said idlers pivoted on said studs and yieldingly held in position, whereby said idlers follow all lateral movements of the belt, substantially as described.

2. A belt driving mechanism for drilling machines, comprising a longitudinal driving shaft, a vertical spindle shaft, pulleys on said shafts, a flat quarter-turn belt connecting said pulleys, a longitudinally adjustable carriage, vertical studs fixed thereto, delivery and return idlers having flanges for engaging the edges of the belt and carried by anti-friction bearings on said studs to follow all lateral movements of the belt, and spring devices for yieldingly holding said idlers in position, substantially as described.

3. A belt driving mechanism for drilling machines, comprising a longitudinal driving shaft, a vertical spindle shaft, pulleys on said shafts, a flat quarter-turn belt connecting said pulleys, a longitudinally adjustable carriage, vertical studs fixed thereto and laterally adjustable thereon, delivery and return idlers having flanges for engaging the edges of the belt and supporting brackets for said idlers pivotally mounted by anti-friction bearings on said studs to swing horizontally whereby said idlers follow all lateral movements of the belts, substantially as described.

4. A belt driving mechanism for drilling machines, comprising a horizontal driving shaft, a vertical spindle shaft, pulleys on said shafts, a flat, quarter-turn belt connecting said pulleys, and delivery and return idlers having flanges for engaging the edges of the belt and pivoted on anti-friction bearings to swing laterally and follow all movements of the belt, said pulleys being yieldingly spring-held in position, substantially as described.

5. A belt driving mechanism for drilling machines, comprising a horizontal driving shaft, a vertical spindle shaft, pulleys on said shafts, a flat, quarter-turn belt connecting said pulleys, delivery and return idlers for the belt, and laterally adjustable studs whereon said idlers are pivoted to swing horizontally, substantially as described.

6. A belt driving mechanism for drilling machines, comprising a horizontal driving shaft, a vertical spindle shaft, pulleys on said shafts, a flat, quarter-turn belt connecting said pulleys, delivery and return idlers for the belt, and laterally adjustable studs whereon said idlers are pivoted to swing horizontally, one at least of said idlers being adjustable to tension the belt, substantially as described.

7. A belt driving mechanism for drilling machines, comprising a horizontal driving shaft, a vertical spindle shaft, pulleys on said shafts, a flat, quarter-turn belt connecting said pulleys, delivery and return idlers having flanges for engaging the edges of the belt, and vertical, laterally adjustable studs whereon said idlers are pivoted to swing horizontally, substantially as described.

8. A belt driving mechanism for drilling machines, comprising a horizontal driving shaft, a vertical spindle shaft, pulleys on said shafts, a flat, quarter-turn belt connecting said pulleys, delivery and return idlers having flanges for engaging the side edges of the belt, vertical studs normally fixed in position, and supporting brackets for said idlers pivotally mounted by anti-friction bearings on said studs and yieldingly held in position to permit said idlers to follow the lateral movements of the belt, substantially as described.

9. A belt driving mechanism for drilling machines, comprising a horizontal driving shaft, a vertical spindle shaft, pulleys on said shafts, a flat, quarter-turn belt connecting said pulleys, delivery and return idlers having flanges for engaging the edges of the belt, vertical, laterally adjustable studs normally fixed in position, and supporting brackets for said idlers carried by anti-friction bearings on said studs, substantially as described.

10. A belt driving mechanism for drilling machines, comprising a horizontal driving shaft, a vertical spindle shaft, pulleys on said shafts, a flat, quarter-turn belt connecting said pulleys, delivery and return idlers having flanges for engaging the edges of the belt, vertical, laterally adjustable studs whereon said idlers are carried by anti-friction bearings to swing horizontally, and spring devices for yieldingly holding said idlers in position, substantially as described.

11. A belt driving mechanism for drilling machines, comprising a horizontal driving shaft, a vertical spindle shaft, pulleys on said shafts, an endless, quarter-turn belt connecting said pulleys, delivery and return idlers for the belt, stud shafts whereon said idlers are journaled, and supporting brackets having arms provided with seats open at their upper ends wherein the opposite ends of said stud shafts are removably seated, said seats and the ends of said stud shafts being shaped to hold the latter against rotation, substantially as described.

12. A belt driving mechanism for drilling machines, comprising a horizontal driving shaft, a vertical spindle shaft, pulleys on said shafts, a flat, quarter-turn belt connecting said pulleys, delivery and return idlers for the belts, an idler carriage frame having connected sides and ends and a transverse member projecting inwardly from one of its sides, vertical studs on the rear end of the carriage frame and on said transverse member, horizontal studs whereon said idlers are journaled, and brackets pivoted on said vertical studs and having arms provided with slots open at their upper ends wherein said horizontal studs are removably seated, substantially as described.

JAMES F. MIRRIELEES.